United States Patent [19]
Bickel et al.

[11] 4,379,633
[45] Apr. 12, 1983

[54] APPARATUS FOR MAINTAINING ADJUSTMENT OF COINCIDENCE AND RELATIVE PHASE RELATIONSHIP OF LIGHT BEAMS IN AN INTERFEROMETER

[75] Inventors: Wolf Bickel, Bergisch Gladbach; Walter Kaule, Cologne; Erik Primbsch, Ahrensburg, all of Fed. Rep. of Germany

[73] Assignee: Krautkramer-Branson, Inc., Stratford, Conn.

[21] Appl. No.: 282,036

[22] Filed: Jul. 10, 1981

[30] Foreign Application Priority Data
Aug. 6, 1980 [DE] Fed. Rep. of Germany .... 30 29 716

[51] Int. Cl.³ .................. G01N 29/04; G01B 9/02
[52] U.S. Cl. ................................. 356/359; 73/657; 356/360
[58] Field of Search ............... 356/349, 359, 360; 73/653, 655, 656, 657

[56] References Cited
U.S. PATENT DOCUMENTS
4,046,477  9/1977  Kaule ........................... 356/358 X
4,053,231 10/1977  Fletcher et al. ............... 356/346 X

FOREIGN PATENT DOCUMENTS
2818166 11/1979 Fed. Rep. of Germany ........ 73/655

Primary Examiner—John K. Corbin
Assistant Examiner—Matthew W. Koren
Attorney, Agent, or Firm—Ervin B. Steinberg; Philip J. Feig

[57] ABSTRACT

An apparatus for maintaining the adjustment of coincidence and relative phase relationship of light beams in an optical interferometer comprises the passing of a measuring light beam and of a control light beam through substantially the same paths of the interferometer. Any change in optical alignment of interferometer components from a set condition is manifest as a change of the electrical signal produced by photoelectric sensing means which receive the control beam. The change of the electrical signal is processed by an electrical circuit and fed to one or more positioning means supporting an optical component of the interferometer for causing a repositioning of such component to thereby restore the set condition. In a typical embodiment, the component is a reflective surface mounted on a set of piezoelectric positioning means.

21 Claims, 7 Drawing Figures

APPARATUS FOR MAINTAINING ADJUSTMENT OF COINCIDENCE AND RELATIVE PHASE RELATIONSHIP OF LIGHT BEAMS IN AN INTERFEROMETER

BRIEF SUMMARY OF THE INVENTION

This invention relates to an arrangement for automatically maintaining an adjustment of the coincidence and of the relative phase relationship of beams of light in the field of view of an interferometer. More specifically the invention concerns an interferometer in which beams of laser light are so time delayed in relation to one another over the different optical paths as to satisfy the interference condition required for the production of an amplitude modulated output signal of the measuring beam which has been frequency-modulated by ultrasonic deformations occurring at a workpiece surface.

When an ultrasonic wave is produced in a workpiece under test, propagation of the ultrasonic wave in the workpiece is disturbed at those zones which have different acoustic properties from the surroundings. Such zones may, for example, comprise inclusions of foreign matter, delamination of the material, structural changes, and so on. In each instance an ultrasonic wave pattern containing information about the interior of the workpiece is present at the workpiece surface. It is known to sense the different acoustic pressures of the ultrasonic wave pattern by means of probes, for instance, electroacoustic transducers. The probes convert the acoustic pattern sensed to electrical voltage signals, and the workpiece can be evaluated on the basis of these voltages per unit of time, or simply on the basis of the voltage amplitudes.

Contactless optical methods are also known for scanning the ultrasonic wave patterns, e.g. optical interferometer systems, as described in Ultrasonic Testing of Materials (book) by J. & H. Krautkramer, 2nd edition, Springer-Verlag, Berlin, Heidelberg, New York (1977), pages 165–172. As described, the surface of the workpiece at which the sonic waves are to be sensed is illuminated with monochromatic light, e.g. a laser, often a frequency-stabilized single-mode laser. The laser light scattered or reflected at the surface of the workpiece is frequency-modulated due to the Doppler effect arising from the ultrasonic deformation of the workpiece surface. This frequency modulation is converted to brightness fluctuations (amplitude modulation) in interferometer devices and converted into electrical signal voltages in photodetectors. The voltage signals derived are then displayed, for example, on a cathode-ray oscilloscope and used for evaluation.

In an interferometer system of this kind, the incoming beam of light is generally divided, passed through the interferometer over two paths of different optical lengths, and the two beams are re-combined. After this has been done, the effect is that there is darkness, maximum brightness, or a mean brightness in the field of view of the interferometer, depending upon the relative phase relationship. If the light entering the interferometer is modulated with the frequency of the ultrasonic wave and delayed over one of the paths by an amount of time corresponding approximately to one half the oscillation period of the ultrasonic wave, the brightness in the field of view of the interferometer will fluctuate at this ultrasonic frequency. Photodetectors disposed at the proper image plane will deliver an electrical signal voltage the values of which per unit of time contain these brightness fluctuations.

A disadvantage of these interferometer systems is that the optical paths of the interferometer arms are affected, for example, by thermal effects, and if the laser is operated as a pulsed laser its frequency will not remain constant due to the fluctuating thermal stress. If these instabilities cause that the beams of light passed over the different light paths are no longer coincident, then an interference pattern is formed in the field of view, or if the ratio of the transit times over the different optical paths in the interferometer is disturbed, a change of the basic brightness in the field of view is experienced.

As a rule, these disturbances cause both interference patterns and brightness fluctuations per unit of time in the field of view. To avoid these problems, the interferometer has to be adjusted before measurement can be made. In addition, the field of view must be constantly monitored visually, it usually being necessary to make constant re-adjustments manually to at least one optical element, e.g. a mirror, of the interferometer in order to maintain the desired adjustment for making ultrasonic measurements.

It is an object of the invention to provide an arrangement for compensating for misalignment of optical interferometer elements and for maintaining an adjustment constant, once it has been made, by means of an automatically operating control mechanism.

Other details and advantages of the invention will be explained with reference to the following exemplified embodiments and by means of the drawings.

DETAILED DESCRIPTION OF THE INVENTION

Figure 1:
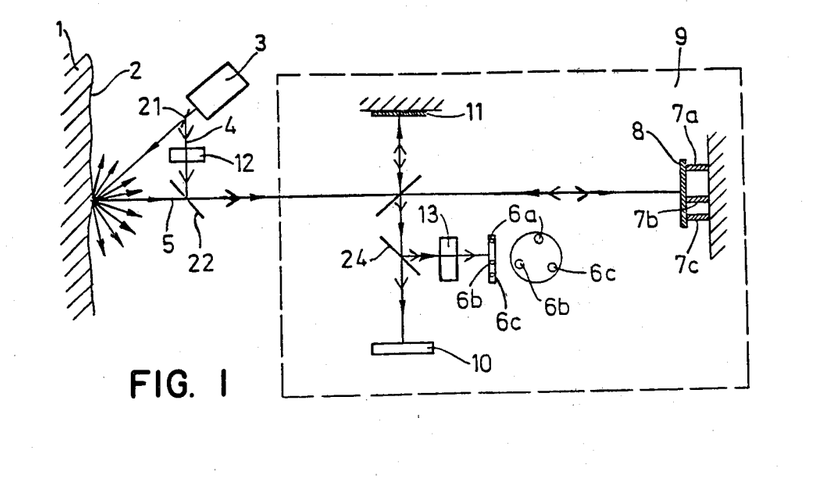
FIG. 1 is a schematic diagram of a preferred embodiment of the apparatus using a Michelson type interferometer.

Referring now to the figures and FIG. 1 in particular, the surface 2 of a workpiece 1, which is to undergo sonic examination, is illuminated by a beam of light from a laser 3. The laser 3 can operate in the continuous wave mode or pulse mode. By means of a mirror 21, a prism of a semireflecting mirror, a small fraction of the beam of light is split away at a location between the laser 3 and the workpiece surface 2, and such beam fraction unaffected by the workpiece surface 2 serves as a control beam 4. This control beam is used to compensate for variations in the interferometer. The control beam 4 is added into the measuring beam 5, the latter being the beam of scattered light from the surface 2 entering the interferometer and used for the measurement. The measuring beam 5 contains the information from the ultrasonic wave pattern manifest on the surface 2 of the workpiece 1. The control beam 4, on the other hand, is unaffected by the physical deformations of the workpiece surface since the light portion forming the control beam is taken directly from the laser. The measuring beam 5 and the control beam 4 traverse the same optical paths in the interferometer 9. In the drawings, the solid arrowheads indicate the direction of propagation of the measuring beam 5 while the open arrowheads indicate the direction of the control beam 4. If components of the interferometer, e.g. the mirror 11, change their position, the interference conditions in the field of view are disturbed. If, for example, the mirror 11 moves axially, but without tilting, e.g. due to vibration or thermal changes in the length of the interferometer arms, the relationship between the transit times in the interferometer also varies, and this is manifest as a change of the interference condition for the measuring beam and, hence, a change of the operating point in respect to the conversion of the frequency modulation of the measuring beam into an amplitude modulation. When an interferometer is used for sensing ultrasonic waves it is fundamentally important that this operating point remain constant, i.e. the interference condition between the beam of light over one optical path, delayed by approximately one half the ultrasonic oscillation period, and the practically non-delayed beam of light over the other optical path. A photodetector 10 which converts the time-dependent light intensity manifest at the location of the detector into an electrical signal value, e.g. a voltage, is disposed in the field of view of the interferometer. In the apparatus shown in FIGS. 1, 2 and 4, the field of view for the measurement is independent of the location within the region of the re-combined rays, since only axis-parallel scattered light from the workpiece surface 2 is evaluated. For the case when a divergent beam of scattered rays originating from scattered light is evaluated by means of a focusing optical system, such as converging lenses (see FIGS. 5 and 6), the corresponding field of view is the plane in which the workpiece surface is imaged.

The non-frequency modulated control beam is subject to the same shift of its interference condition and as a result thereof, the brightness in the field of view changes for the control beam in exactly the same way as for the measuring beam. This brightness change is utilized according to the invention to adjust interferometer components which are capable of counteracting this change in brightness, e.g. the mirror 8.

To this end, three photodetectors 6a, 6b and 6c are disposed in the field of view of the control beam which deliver a voltage to one or more positioning or correcting elements 7a, 7b, 7c typically piezoelectric mounting elements, via corresponding amplifiers 23a, 23b and 23c in accordance with known open and closed loop control processes. If, however, an interferometer component becomes disturbed, e.g. the mirror 11 becomes tilted, the beam of light is no longer reflected back by the mirror on itself or along the set direction. It is then necessary to tilt this mirror or another mirror, e.g. mirror 8, so as to cause the beams to be once again parallel to one another or travel in the set direction, at least in the field of view. To this end, a corresponding optical element of the interferometer, mirror 8 in this case, is mounted on three piezoelectric positioning elements 7a, 7b and 7c. Tilting of a mirror or of another interferometer component will produce a fringe pattern in the field of view of the interferometer, so that the three photodetectors 6a, 6b, 6c, which are each connected via electronic amplifiers 23a, 23b, 23c to the corresponding piezoelectric positioning elements 7a, 7b, 7c, will deliver different signal voltages, with the result that the three piezoelectric correcting elements will produce different adjustments in respect of their length. Hence, the mirror 8 is tilted in the opposite direction until the field of view again assumes the predetermined brightness. Since the control beam has an intensity which is at least comparable to, but is often significantly higher than, the measuring beam, the control beam must not impinge upon the photodetector 10 during the measuring interval during which the photodetector 10 converts the brightness fluctuations to be measured into voltages in the plane of the field of view of the measuring beam.

Figure 3:
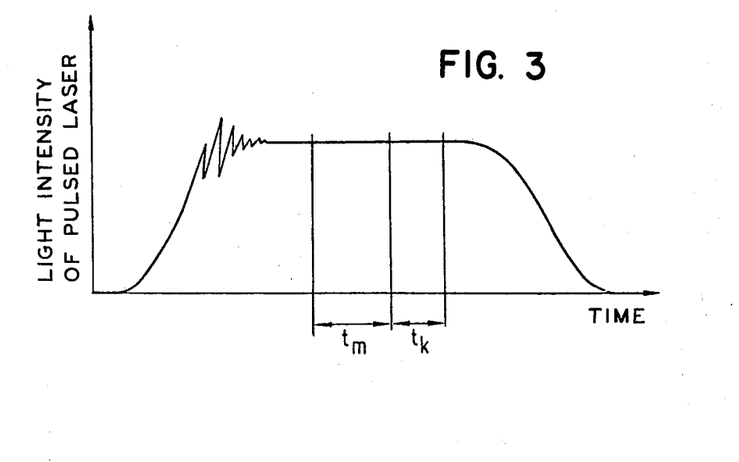
FIG. 3 shows the time-intensity curve for a pulsed laser.

In the case of an interferometer 9 having a light ray path corresponding to the Michelson interferometer, as shown in FIG. 1, the control beam 4 is, for example, supplied to the interferometer through optical shutter means 12, e.g. Pockels cell, during time intervals outside the measuring time interval. FIG. 3 shows a theoretical intensity-time curve for a pulsed laser. According to this curve, once the start-up oscillations of the laser have subsided, the amplitude-modulated voltage from the photodetector 10 is switched, e.g. by electronic means, to an evaluating circuit, which may be a cathode ray oscilloscope, for the duration of the measuring time interval $t_m$ which is governed by the ultrasonic test problem. After the time interval $t_m$, the optical shutter 12, e.g. Pockels cell, opens for the time interval $t_k$ and allows the control beam 4 to pass so that, as already described, the control beam is added into the measuring beam 5. Another optical shutter 13 prevents the measuring beam 5 from shining upon the photodetector system 6a, 6b, 6c during the measuring time interval $t_m$.

Controlling of the positioning elements 7a, 7b, 7c occurs within the control time interval $t_k$ and the corrected condition is retained during the next measuring time interval $t_m$. Then another correction occurs during the time interval $t_k$ if any deviations have occurred in the meantime, and so on.

Figure 4:
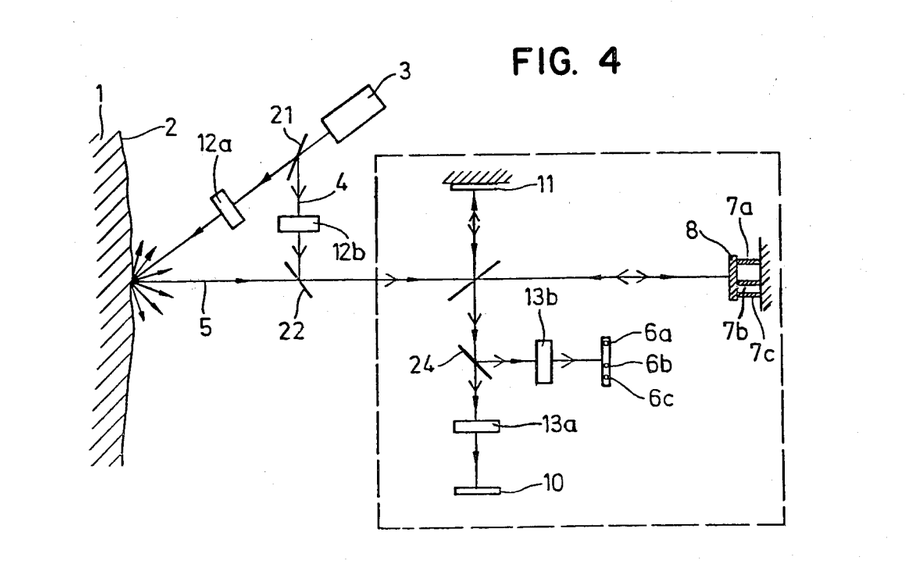
FIG. 4 is a schematic diagram of a preferred embodiment of the apparatus using a Michelson type interferometer with optical shutters.

Alternatively, the beams of light can be fed to the interferometer in a timed sequence by arranging for the measuring beam 5 and the control beam 4 to traverse the optical paths of the interferometer 9 during alternate cycles. The latter arrangement has the advantage in that at any one time there is only one light beam present in the system without any interference from the other beam. For example, as shown in FIG. 4, electronically actuated Pockels cells 12a and 12b acting as shutters can transmit the laser beam for illuminating the workpiece surface 2 during the measuring time interval $t_m$, i.e. the cell 12a is transmissive while the cell 12b is closed to block the control beam 4. During the control time interval $t_k$, the Pockels cell 12a is closed and the Pockels cell 12b is opened. The operation can also be cycled in that the Pockels cell 13a allows the measuring beam to enter the photodetector 10 during the measuring time interval $t_m$, i.e. cell 13a is open, while the Pockels cell 13b is closed. During the control time interval $t_k$, the Pockels cell 13a is closed and the cell 13b is open for allowing the controlling photodetectors 6a, 6b and 6c to be illuminated. An electronic gate ensures that there is no control of the piezoelectric correcting elements outside the control time intervals $t_k$.

Instead of optical shutters, e.g. Pockels cells, for the cyclic transmission of the measuring beam for illuminating the photodetector 10 and of the control beam for illuminating the photoelectric diode system 6a–6c, in an alternative embodiment the electronic circuits following the photodetectors 10 and 6a to 6c can electronically be rendered operative and blocked in a sequential manner.

Figure 2:
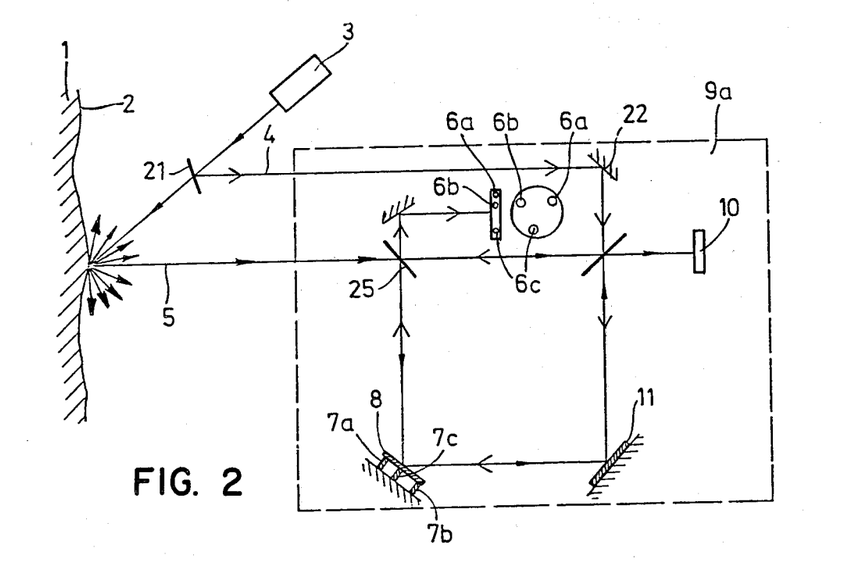
FIG. 2 is a schematic diagram of a preferred embodiment of the apparatus using a Mach-Zehnder type interferometer.

In the case of an interferometer 9a as shown in FIG. 2 having an optical path corresponding to the Mach-Zehnder interferometer, the measuring beam 5 and the control beam 4 can traverse the interferometer 9a simultaneously if the two beams are passed therethrough in the opposite direction. In this way, it is possible to individually decouple the beams so that there is no need to provide cycling of the time intervals for the measuring beam and the control beam. Changes of the interferometer arms in this case act on the two beams in the same manner as already described in connection with the interferometer having an optical beam path corresponding to the Michelson interferometer 9, see FIG. 1.

Figure 5:
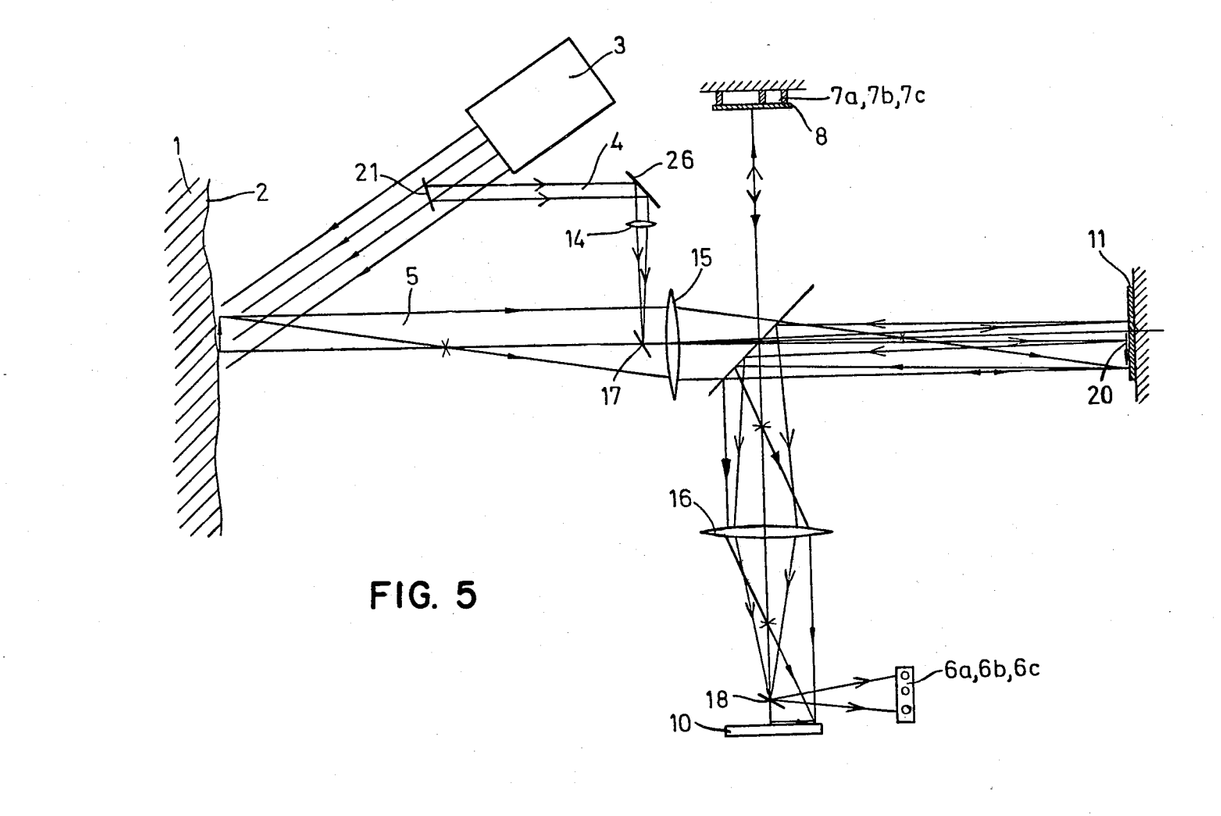
FIG. 5 is a schematic diagram of a preferred embodiment of the apparatus using an interferometer having two focusing systems.

If focusing optical systems are used in the interferometer in order to avoid the limitation of utilizing only parallel scattered rays from the workpiece surface near the axis as described for example in German Offenlegungsschrift OS No. 28 18 166, then as shown in FIG. 5, the difference in the geometry of the optical paths of the measuring beam and of the control beam can be utilized to separate the control beam. This will be explained by way of example with reference to FIG. 5 in respect of an interferometer of the Michelson principle. The same considerations apply to interferometers of the Mach-Zehnder principle. If a larger beam of scattered rays is desired from the workpiece surface, then a small zone of the workpiece surface illuminated by the laser 3 must be imaged on the photodetector 10 by means of a focusing optical system. In this case, the transit time conditions for the delay corresponding to the ultrasonic frequency, and the conditions for the geometric imaging, must both be taken into account, although this will not be discussed in greater detail hereafter since it is discussed in the German Offenlegungsschrift 28 18 166. An intermediate image 20 is produced at a location within the interferometer, e.g. in the reflection plane of the mirror 11, by means of a first converging lens 15 or a corresponding optical system, and this intermediate image is imaged on the photodetector 10 by means of a second converging lens 16 or a corresponding optical system. As already described, the parallel ray control beam 4 (plane wavefronts) is separated out of the laser beam 3 and so focused by means of a converging lens or a corresponding optical system 14 that the focal point is disposed in or near the principal plane of the converging lens 15. The control beam 4 after focusing is inserted into the measuring beam 5 by means of a very small-area mirror or prism 17 which does not disturbingly stop down the measuring beam 5 entering the interferometer. If under these conditions the focal point of the control beam is placed sufficiently close to the principal plane of the lens 15, the aperture angle of the control beam widening out after the focal point is reduced only insignificantly, if at all. The control beam and the measuring beam concurrently traverse the same paths of the interferometer in the same direction. FIG. 5 shows in detail only one interferometer path, the second interferometer path (second interferometer arm) is only indicated.

Since the control beam 4 is divergent as it enters the lens 16, it is focused at a focal point in front of the photodetector 10 which is generally disposed in an image plane of the interferometer. Once again a preferably very small deflecting mirror or prism 18 is disposed in front of the photodetector 10 to separate the control beam. This laterally diverted and separated control beam, which then diverges again, is used to control an interferometer component after a divergence corresponding to the geometric arrangement of the photodetectors 6a, 6b, 6c. Since the control beam traverses the same paths as the measuring beam, the changes arising within the interferometer affect the control beam in exactly the same manner as they are affecting the measuring beam. In the event of a change of the path length, there is manifest a brightness change in the total cross-section of the beam in the plane of photodetectors 6a, 6b, 6c, and there will be a resulting axial re-adjustment of an interferometer component. If an interferometer component tilts, i.e., if its angular position changes with respect to the corresponding beam direction, a non-uniform brightness or a fringe pattern will form in the plane of the photodetectors 6a, 6b, 6c. This occurrence will cause by means of the control circuit an interferometer component to tilt in the opposite direction to provide the correction as already described.

The optical paths over the longer interferometer arm can be so influenced optically by a medium having an appropriate refractive index as to provide intermediate images on both mirrors 11 and 8, these intermediate images having a common image on the photodetector 10 in accordance with the conditions of interferometer operation. A medium of this kind for producing intermediate images over paths of optically different lengths has been described in the German Offenlegungsschrift No. 28 18 166 referred to hereinbefore.

Figure 6:
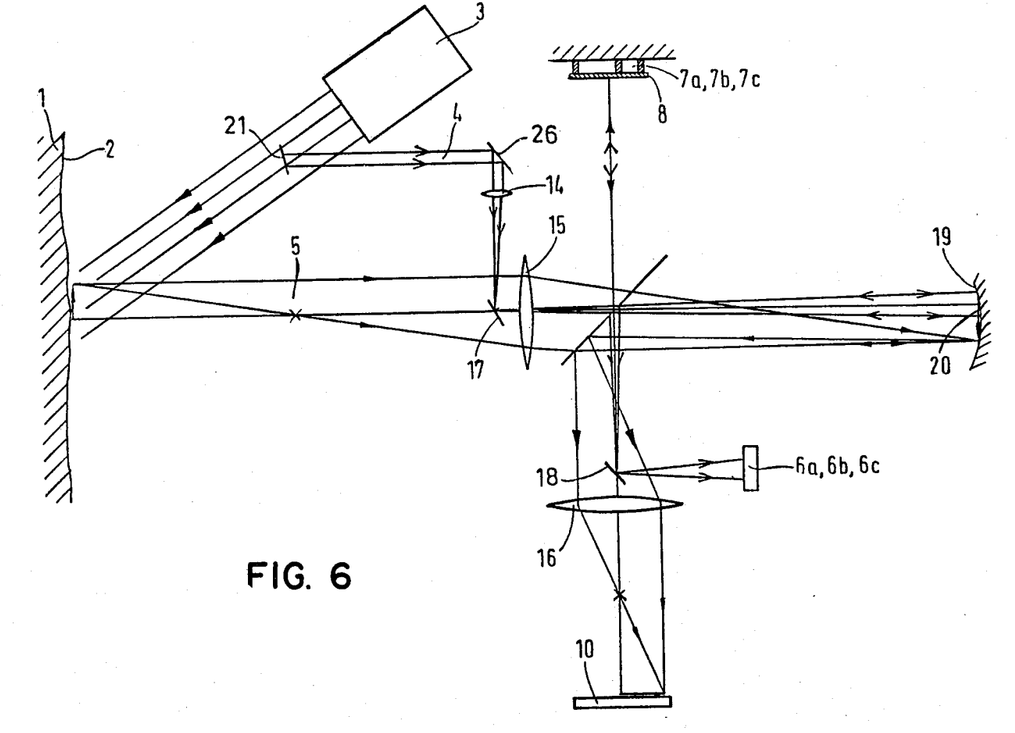
FIG. 6 is a schematic diagram disclosing an apparatus using an interferometer having three focusing systems.

In a modification as shown in FIG. 6, a concave mirror 19 can be provided, for example at the position of the intermediate image, such concave mirror focusing only the control beam, the focal point preferably being placed at the apex or principal plane of the lens 16, so that the control beam can be separated here. This may be advantageous if, because of the beam geometry, the focal point of the lens 16 and the imaging plane at the photodetector 10 are in very close proximity. A converging lens may be used instead of the concave mirror at the location of the intermediate image. If the location of the intermediate image 20 is a reflecting interferometer component, it will be preferable to use a concave mirror, whereas if the intermediate image 20 is at some other point in the optical path, then a converging lens may be necessary or advantageous.

Figure 7:
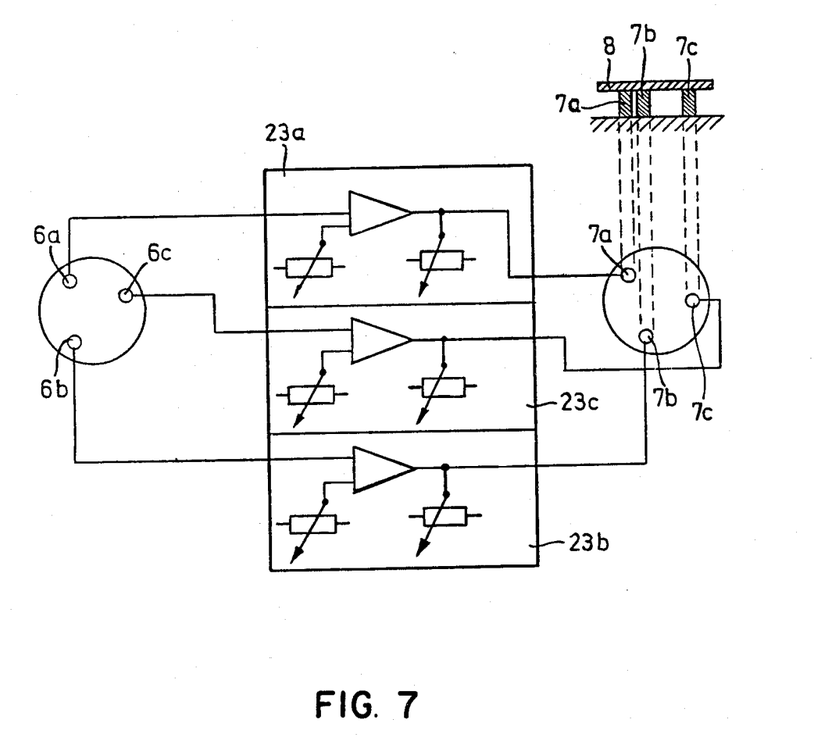
FIG. 7 is a schematic block diagram of an electrical circuit for controlling the correcting elements by means of electrical signals from the photodetectors.

The basic adjustment and control may proceed, for example, as follows: If interference fringes or brightness fluctuations due to changes in interferometer components occur in the field of view of the measuring beam 5, i.e. in the plane of the photodetector 10, then the same interference fringes or brightness changes also appear in the field of view of the control beam 4 in the plane of the photodetector system 6a to 6c. For achieving the initial adjustment the control voltage to the detectors 6a to 6c is switched off and the interferometer is adjusted manually by applying to the piezoelectric correcting elements direct current voltages so adjusted as to provide the desired brightness (operating point) in the field of view and causing an illumination which is without interference fringes. On completion of this adjustment, the direct current voltages are maintained to the piezoelectric correcting elements. During operation, the control voltages obtained from the photodetectors 6a to 6c are then superimposed on these initial voltages. These control voltages are obtained, for example, by connecting each of the photodetectors 6a to 6c to its own differential amplifier 23a to 23c (see FIG. 7), to which set-value voltages are fed respectively as comparison voltages. If the voltage delivered by the photodetector responsive to the brightness is equal to the set-value voltage, the differential amplifier does not provide a control voltage to its associated piezoelectric positioning element. If the brightness at the photodetector varies, the differential amplifier delivers a control voltage of appropriate polarity to the piezoelectric correcting element and the latter will so change that the set-value voltage is again delivered at the input of the differential amplifier by the corresponding photodetector. As a result, any changes in the optical paths of the interferometer arms can be compensated for by means of three piezoelectric correcting elements cooperating with at least one optical element of the interferometer. This control process using electronic differential amplifiers is generally known and has been described only briefly here.

Once an interferometer measuring system for the reception of ultrasonic waves has been adjusted by using the method according to the invention, any changes occurring in the optical paths during operation, e.g. due to thermal influences, which would, absent the present arrangement, have an adverse effect on the interference conditions, are automatically compensated.

What is claimed is:

1. The method for automatically maintaining an adjustment of the coincidence and of the relative phase relationship of beams of light in the field of view of an interferometer in which beams of laser light are so delayed in time relative to one another over the different optical paths as to satisfy the interference condition required for producing an amplitude modulated signal from a measuring beam which has been frequency modulated by ultrasonic deformations manifest on a workpiece surface comprising:
   illuminating the workpiece surface on which ultrasonic wave deformations are manifest with a beam of laser light and passing the light reflected at said workpiece surface as a measuring beam, frequency modulated by said deformations, to an optical interferometer;
   separating a portion of said laser light from said laser beam before it is incident on the workpiece surface and passing said non-incident portion as a control beam to said interferometer;
   causing said measuring beam and said control beam to traverse said interferometer through substantially the same optical paths;
   sensing by means of first photoelectric means said measuring beam after it has traversed said interferometer and providing a corresponding amplitude modulated electrical signal;
   disposing in the field of view plane of the control beam second photoelectric means which responsive to the control beam illumination thereupon provide an electrical control signal adapted to indicate a change of the alignment of the optical paths of the interferometer from a set condition, and
   applying said control signal from said second photoelectric means to electromechanical positioning means supporting an optical component of the interferometer to cause a positioning adjustment of said optical component for restoring said set condition responsive to said control signal being indicative of such change.

2. The method as set forth in claim 1, said optical component comprising a light reflective surface disposed for reflecting said measuring beam and said control beam along their paths through said interferometer.

3. The method for automatically maintaining an adjustment of the coincidence and of the relative phase relationship of beams of light in the field of view of an interferometer in which beams of laser light are so delayed in time relative to one another over the different optical paths as to satisfy the interference condition required for producing an amplitude modulated signal from a beam which has been frequency modulated by ultrasonic deformations manifest on a workpiece surface comprising:
   illuminating the workpiece surface on which ultrasonic wave deformations are manifest with a beam of laser light and passing the light reflected at said workpiece surface as a measuring beam, frequency modulated by said deformations, to an optical interferometer;
   separating a portion of said laser light from said laser beam before it is incident on the workpiece surface and passing said non-incident portion as a control beam during control time intervals to said interferometer superposed on said measuring beam;
   causing said measuring beam and said control beam to traverse said interferometer through substantially the same optical paths in the same direction;
   sensing by means of first photoelectric means said measuring beam after it has traversed said interferometer and providing a corresponding amplitude modulated electrical signal;
   disposing in the field of view plane of the control beam second photoelectric means which responsive to the control beam illumination thereupon provide an electrical control signal adapted to indicate a change of the alignment of the optical paths of the interferometer from a set condition, and
   applying said control signal from said second photoelectric means to electromechanical positioning means supporting an optical component of the interferometer to cause a positioning adjustment of said optical component for restoring said set condition responsive to said control signal being indicative of such change.

4. The method as set forth in claim 3, said optical component comprising a light reflective surface disposed for reflecting said measuring beam and said control beam along their paths through said interferometer.

5. The method as set forth in claim 4, said control time intervals being produced by providing a first optical control means in the light path of said control beam before said beam is passed to said interferometer and controlling said optical control means to selectively block or pass said control beam to said interferometer, and providing a second optical control means in the light path of said control beam to said second photoelectric means for causing said second photoelectric means to receive illumination only when said first optical control means passes said control beam to said interferometer.

6. The method as set forth in claim 4, and providing respective optical control means in the path of said measuring beam and in the path of said control beam before said beams enter said interferometer, and providing additional optical control means in front of said first and of said second photoelectric means; said control time intervals being established by controlling said respective optical control means in a manner inhibiting the measuring beam from entering said interferometer and inhibiting said first photoelectric means from receiving light responsive to said control beam while causing said control beam to enter said interferometer and causing said second photoelectric means to be responsive to the illumination from said control beam; and establishing measuring time intervals, alternating with said control time intervals, during which said respective optical control means are controlled in a manner inhibiting the control beam from entering said interferometer and inhibiting said second photoelectric means from receiving light responsive to said measuring beam while causing said measuring beam to enter said interferometer and causing said first photoelectric means to be responsive to the illumination from said measuring beam.

7. The method for automatically maintaining an adjustment of the coincidence and of the relative phase relationship of beams of light in the field of view of an interferometer in which beams of laser light are so delayed in time relative to one another over the different optical paths as to satisfy the interference condition required for producing an amplitude modulated signal from a measuring beam which has been frequency modulated by ultrasonic deformations manifest on a workpiece surface comprising:

illuminating the workpiece surface on which ultrasonic wave deformations are manifest with a beam of laser light and passing the light reflected at said workpiece surface as a measuring beam, frequency modulated by said deformations, to an optical interferometer;

separating a portion of said laser light from said laser beam before it is incident on the workpiece surface and passing said non-incident portion as a control beam to said interferometer;

causing said measuring beam and said control beam to traverse said interferometer through substantially the same optical paths but in opposite directions;

sensing by means of first photoelectric means said measuring beam after it has traversed said interferometer and providing a corresponding amplitude modulated electrical signal;

disposing in the field of view plane of the control beam second photoelectric means which responsive to the control beam illumination thereupon provide an electrical control signal adapted to indicate a change of the alignment of the optical paths of the interferometer from a set condition, and applying said control signal from said second photoelectric means to electromechanical positioning means supporting an optical component of the interferometer to cause a positioning adjustment of said optical component for restoring said set condition responsive to said control signal being indicative of such change.

8. The method as set forth in claim 7, said interferometer being of the Mach-Zehnder type, said optical component comprising a light reflective surface disposed in said interferometer and reflecting said measuring beam and said control beam along their paths through said interferometer, and said positioning means comprising piezoelectric means supporting said optical component.

9. The method for automatically maintaining an adjustment of the coincidence and of the relative phase relationship of beams of light in the field of view of an interferometer in which beams of laser light are so delayed in time relative to one another over the different optical paths as to satisfy the interference condition required for producing an amplitude modulated signal from a measuring beam which has been frequency modulated by ultrasonic deformations manifest on a workpiece surface comprising:

illuminating the workpiece surface on which ultrasonic deformations are manifest with a beam of laser light;

providing a focussing lens for receiving the light reflected at the workpiece surface and passing the reflected light as a measuring beam, frequency modulated by said deformations, to an optical interferometer which includes focussing optical elements for processing divergent light rays, said focussing lens causing an intermediate image of the illuminated workpiece surface on a reflective surface disposed in said interferometer;

separating a portion of said laser beam before it is incident on the workpiece surface;

focussing said non-incident beam portion to cause it to have a focal point disposed in or in proximity to the principal plane of the focussing lens focussing said light reflected at said workpiece surface and causing said non-incident beam portion to become superposed on said measuring beam as a control beam at or in proximity to the focal point of said control beam;

causing said measuring beam and said control beam to traverse said interferometer through substantially the same optical paths;

sensing by means of first photoelectric means said measuring beam after it has traversed said interferometer and providing a corresponding amplitude modulated electrical signal usable for measuring said deformations;

disposing in front of said first photoelectric means an optical element for separating said control beam from said measuring beam;

transmitting said separated control beam to second photoelectric means disposed in the field of view plane of the control beam and said second photoelectric means responsive to the illumination thereupon by said control beam providing an electrical control signal adapted to indicate a change of the alignment of the optical paths of the interferometer from a set condition, and applying said control signal from said second photoelectric means to electromechanical positioning means supporting an optical component of the interferometer to cause a positioning adjustment of said optical component for restoring said set condition responsive to said control signal being indicative of such change.

10. The method as set forth in claim 9, said intermediate image being formed on a plane reflective surface disposed in said interferometer.

11. The method as set forth in claim 9, said intermediate image being formed on a concave reflective surface disposed in said interferometer.

12. An apparatus for automatically maintaining an adjustment of the coincidence and of the relative phase relationship of beams of light in the first of view of an interferometer in which beams of laser light are so delayed in time relative to one another over different optical paths as to satisfy the interference condition required for producing an amplitude modulated signal from a measuring beam which has been frequency modulated by ultrasonic deformations manifest on a workpiece surface comprising:

a laser disposed for illuminating with a beam of laser light the workpiece surface on which ultrasonic wave deformations are manifest;

beam splitting means disposed in said beam of laser light for separating a portion of said laser light before it is incident upon said workpiece surface;

an optical interferometer disposed for receiving the laser light reflected on said workpiece surface as a measuring beam;

means disposed for receiving said separated laser light portion and superimposing it as a control beam on said measuring beam for causing said measuring beam and said control beam to traverse said interferometer along substantially the same paths;

first photoelectric means disposed for receiving said measuring beam after it has traversed said interferometer for providing a corresponding amplitude modulated electrical signal usable for measuring said deformations;

second photoelectric means disposed in the field of view plane of said control beam after said control beam has traversed said interferometer for providing an electrical control signal adapted to indicate a change of the alignment of the optical paths of the interferometer from a set condition;

electromechanical positioning means supporting at least one optical component forming a part of the optical paths of said interferometer, and means for causing said control signal to be effective upon said positioning means for providing a positioning adjustment of said optical component responsive to said control signal being indicative of a change of the optical paths from a set condition.

13. An apparatus as set forth in claim 12, said optical component forming a part of the optical paths of said interferometer comprising a light reflective surface disposed for reflecting said measuring beam and said control beam along their paths through said interferometer.

14. An apparatus as set forth in claim 13, said electromechanical positioning means comprising three piezoelectric elements supporting said reflective surface, and said control signal adapted to act upon one or more of said piezoelectric elements for causing a change of the length of the respective piezoelectric element controlled.

15. An apparatus as set forth in claim 13, said interferometer being of Michelson type and said means disposed for receiving said separated laser light causing said control beam to traverse said interferometer paths in the same direction as said measuring beam, and optical control means disposed in the path of said control beam for causing said control beam to be received by said interferometer only during predetermined control time intervals and said second photoelectric means receiving light only during said control time intervals.

16. An apparatus as set forth in claim 13, said interferometer being of the Michelson type and said means disposed for receiving said separated laser light causing said control beam to traverse said interferometer paths in the same direction as said measuring beam, and respective optical control means disposed in the path of said measuring beam and of said control beam for providing alternate measuring and control time intervals by causing during a measuring time interval said measuring beam to be received by said interferometer and said first photoelectric means to be responsive to the light from the measuring beam after traversing said interferometer while said control beam is blocked from being received by said interferometer and by said second photoelectric means being blocked from receiving light, and by causing during a control time interval said control beam to be received by said interferometer and said second photoelectric means to be responsive to the light from the control beam after traversing said interferometer while said measuring beam is blocked from being received by said interferometer and said first photoelectric means is blocked from receiving light.

17. An apparatus for automatically maintaining an adjustment of the coincidence and of the relative phase relationship of beams of light in the field of view of an interferometer in which beams of laser light are so delayed in time relative to one another over different optical paths as to satisfy the interference condition required for producing an amplitude modulated signal from a measuring beam which has been frequency modulated by ultrasonic deformations manifest on a workpiece surface comprising:

a laser disposed for illuminating with a beam of laser light the workpiece surface on which ultrasonic wave deformations are manifest;

beam splitting means disposed in said beam of laser light for separating a portion of said laser light before it is incident upon said workpiece surface;

an optical interferometer disposed for receiving the laser light reflected on said workpiece surface as a measuring beam;

means disposed for receiving said separated laser light portion and transmitting it as a control beam to said interferometer and causing said control beam to traverse said interferometer along substantially the same paths as said measuring beam but in opposite direction;

first photoelectric means disposed for receiving said measuring beam after it has traversed said interferometer for providing a corresponding amplitude modulated electrical signal usable for measuring said deformations;

second photoelectric means disposed in the field of view plane of said control beam after said control beam has traversed said interferometer for providing an electrical control signal adapted to indicate a change of the alignment of the optical paths of the interferometer from a set condition;

electromechanical positioning means supporting at least one optical component forming a part of the optical paths of said interferometer, and means causing said control signal to be effective upon said positioning means for providing a positioning adjustment of said optical component responsive to said control signal being indicative of a change of the optical paths from a set condition.

18. An apparatus as set forth in claim 17, said interferometer being of the Mach-Zehnder type and including optical means for causing said measuring beam after traversing said interferometer to be transmitted only to said first photoelectric means and for causing said control beam after traversing said interferometer to be transmitted only to said second photoelectric means, and said optical component forming a part of the optical paths of said interferometer comprising a light reflective surface disposed for reflecting said measuring beam and said control beam along their respective paths through said interferometer.

19. An apparatus for automatically maintaining an adjustment of the coincidence and of the relative phase relationship of beams of light in the field of view of an interferometer in which beams of laser light are so delayed in time relative to one another over different optical paths as to satisfy the interference condition required for producing an amplitude modulated signal from a measuring beam which has been frequency modulated by ultrasonic deformations manifest on a workpiece surface comprising:

a laser disposed for illuminating with a beam of laser light the workpiece surface on which ultrasonic wave deformations are manifest;

beam splitting means disposed in said beam of laser light for separating a portion of said laser light before said light is incident upon said workpiece surface;

a first converging lens disposed for receiving the laser light reflected at the workpiece surface and transmitting said reflected light as a measuring beam to an interferometer;

optical means disposed for receiving said non-incident portion of laser light and bringing it to a focus at a focal point disposed in or in proximity to the principal plane of said first converging lens and transmitting said non-incident laser light portion as a control beam to said interferometer for causing said control beam to traverse said interferometer along substantially the same paths as said measuring beam;

intermediate image forming means disposed in said interferometer for receiving and reflecting said measuring beam and said control beam;

a second converging lens disposed in said interferometer for receiving said images from said intermediate image forming means;

first photoelectric means disposed for receiving said measuring beam after traversing said interferometer and said second converging lens for providing a corresponding amplitude modulated electrical signal usable for measuring said deformations;

said second converging lens causing said control beam to be focussed at a focal point disposed in front of said first photoelectric means;

beam deflecting means disposed substantially at said focal point in front of said first photoelectric means for separating said control beam from said measuring beam;

second photoelectric means disposed in the field of view plane of said control beam for receiving said control beam from said beam deflecting means and for providing an electrical control signal adapted to indicate a change of the alignment of the optical paths of the interferometer from a set condition;

electromechanical positioning means supporting at least one optical component forming a part of the optical paths of said interferometer, and means causing said electrical control signal to be effective upon said positioning means for providing a positioning adjustment of said optical component responsive to said electrical control signal being indicative of a change of the optical paths of said interferometer from a set condition.

20. An apparatus as set forth in claim 19, said intermediate image forming means comprising a plane reflective surface.

21. An apparatus as set forth in claim 19, said intermediate image forming means comprising a concave reflective surface.

* * * * *